Feb. 26, 1963    P. GINDES ET AL    3,078,724
DAMPED ACCELEROMETER
Filed Oct. 19, 1959
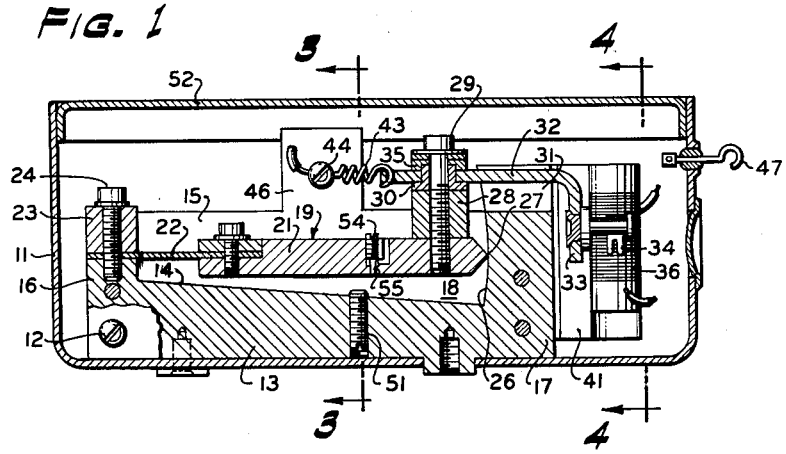
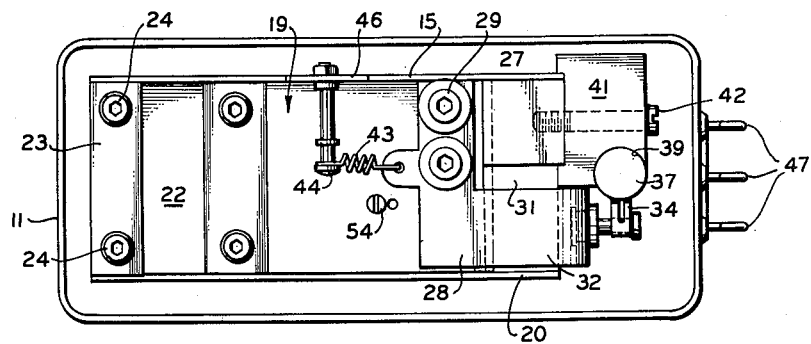
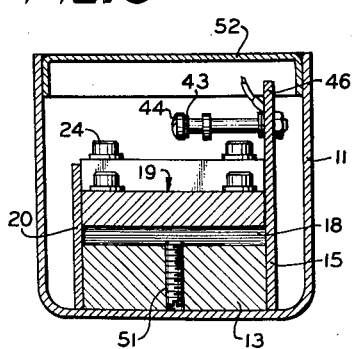
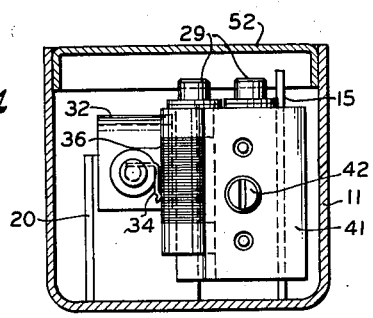
INVENTORS,
PHILIP GINDES &
ALBERT S. CRAIG
HERZIG & JESSUP,
ATTORNEYS
BY Warren T. Jessup

3,078,724
DAMPED ACCELEROMETER
Philip Gindes and Albert S. Craig, Los Angeles, Calif., assignors, by mesne assignments, to United Industrial Corporation, Los Angeles, Calif., a corporation of Delaware
Filed Oct. 19, 1959, Ser. No. 847,256
10 Claims. (Cl. 73—516)

This invention relates to acceleration sensing devices of accelerometers, and particularly to means for damping oscillations of the acceleration sensing mass and for detecting or reading out the position thereof.

It is an object of this invention to provide improved and simplified means for damping oscillations of the acceleration sensing mass of an accelerometer.

It is a further object of this invention to provide improved means for adjusting and controlling the rate of damping of the acceleration sensing mass.

It is a further object of this invention to provide simple and improved means for detecting or reading out the position of the acceleration-sensing mass within its case or chamber.

It is a further object of this invention to provide an accelerometer wherein the acceleration sensing mass serves per se as a piston forming a dash pot for damping its own oscillations, and in so doing employs the entire cross-sectional area of the mass as the area damping of the piston.

It is another object of this invention to provide an accelerometer having adequate damping which is substantially unaffected by temperature change and which has no friction caused by sliding or rubbing together of parts.

In accordance with these and other objects which will become apparent hereinafter, a preferred form of the present invention will now be described in connection with the accompanying drawing wherein:

FIG. 1 is a longitudinal section;
FIG. 2 is a top plan view with cover removed; and
FIGS. 3 and 4 are cross sections taken on the corresponding section lines in FIG. 1.

Referring to the drawing, 11 designates a rectangular housing within which is secured by screws 12 a chamber-forming body 13 having a sloping bottom 14, integral end walls 16 and 17, and side walls 15 and 20. The body 13 forms a damping chamber 18 opening upwardly. The chamber 18 is closed off by the acceleration sensing mass in the form of a generally horizontal rectangular plate 19 formed of a thick flat bar 21 to which is secured a leaf spring 22. The end of the leaf spring 22 is clamped to the top of the end wall 16 by a block 23 and mounting screws 24. The flexibility of the leaf spring 22 forms a hinge allowing the plate or mass 19 to oscillate up and down in the chamber 18.

The inner surface of the opposite wall 17 is formed on an arc 26 of a substantially circular cylinder centered on the hinge, and the adjacent end of the plate 21 is pointed as shown at 27 to form an edge spaced as close as possible to the surface 26 within manufacturing tolerances without actually touching the same. The width of the plate 19 formed of the bar 21 and leaf 22 is similarly chosen to leave a minute clearance with the side walls 15 and 20 of the chamber 18. At the end of the plate 19 opposite from the edge 27, the chamber 18 is substantially hermetically sealed by the clamping of the leaf 22 to the wall 16. Thus, as the plate 19 oscillates up and down in the chamber 18, air can enter or leave the chamber only through the cracks between the side edges of the plate 19 and the side walls of the housing 11 and the end of the plate 19 adjacent the arcuate wall 26. As a result, the air in the chamber tends to be compressed or expanded with resultant damping of the oscillations of the plate 19.

Adjacent the free end of the oscillating plate 19 and to the upper surface thereof block 28 is secured by screws 29. A notch 31 is formed in the end wall 17. Through the notch and over the wall 17 extends a conducting arm 32 secured to the block 28 by screws 29. Arm 32 is insulated from block 28 by grommet 30 and washer 35. The arm 32 is turned downward outside the wall 17 as shown at 33, and has secured thereto a contact member or brush 34 that slides back and forth on a helically wound resistance 36. The resistance 36 is wound on an insulating mandrel 37 mounted in a quarter cylindrical recess 39 formed in an insulating block 41 secured to the wall 17 by a screw 42. By means of a flexible conductor or pig-tail 43, the inner end of the arm 32 is connected to a terminal screw 44 insulatedly secured to an upstanding tab portion 46 formed on the wall 15. The two ends of the resistance element 36 and the terminal 44 are connected by means of suitable leads to respective three terminals 47 which extend insulatedly through the end wall of the housing 11.

Downward excursions of the plate 21 are limited by a stop set screw 51, while upward excursions are limited by contact between the head of the screw 29 and the cover plate 52 of the housing 11.

The resiliency of the leaf spring 22 serves to bias or return the plate 21 to a central position, from which it is moved one way or the other by either downward or upward acceleration of the housing 11 and the body 13 therein. The instantaneous position of the plate 21 with respect to the body 13 is detected or read out constantly by the position of the slider 34 on the resistance 36, which may be connected in potentiometer fashion if desired, or by any other suitable readout circuitry or means. By virtue of the fact that the arm 32 extends over the wall 17 and away from the hinge member 22, the readout lever arm is virtually doubled over the lever arm of the center of mass of the plate 19 with resultant doubling of readout precision.

If desired, the position of the mass or plate 19 may be read out by a magnetic core in well known fashion.

Damping of the mass 19 may be effected by regulation of a needle valve 54 formed in an orifice 55 passing through the plate 21 and in communication with the chamber 18. This adjustable orifice may, if desired, be placed in any wall of the body forming the chamber 18, and has been shown in the movable mass 19 because of the ready access for adjustment from the upper portion of the housing 11 when the cover plate 52 is removed.

Such damping adjustment may, if desired, be constituted by plurality of small orifices passing through the plate 21 or body 13 rather than by a single adjustable orifice. In this way, gas, such as air, leaves or enters the chamber 18 through laminar flow with resulting linearity in the damping factor.

While the instant invention has been shown and described herein in what is conceived to be the most practical and preferred embodiment, it is recognized that departures may be made therefrom within the scope of the invention which is therefore not to be limited to the details disclosed herein but is to be afforded the full scope of the claims.

What is claimed is:

1. Acceleration sensing device comprising: means forming a chamber containing fluid, which may be air, and having a closed end and walls extending therefrom and defining an open end, an acceleration sensing mass positioned in said chamber and having a configuration to provide a minute clearance with said walls, said sensing mass forming a movable closure for said chamber, said mass substantially hermetrically sealing said chamber and being movable to and fro in said chamber to enlarge and ensmall the volume of said chamber so as to cause fluid therein to be compressed and expanded, said mass being hingedly mounted to a wall of said chamber, and substantially completely closing said chamber, thereby to restrict ingress and egress of fluid from said chamber and to cause the fluid to be compressed and expanded with resultant damping of the oscillations of said sensing mass.

2. Apparatus in accordance with claim 1 wherein said mass comprises a substantially flat plate having an edge hinged to said wall.

3. Apparatus in accordance with claim 2 wherein said hinged mounting is effected by constituting a portion of said plate as a resilient leaf spring secured substantially hermetically to said wall.

4. Apparatus in accordance with claim 2 wherein said plate is substantially rectangular and said hinge mounting is at one edge thereof.

5. Apparatus in accordance with claim 1 wherein the wall of said chamber opposite to said hinge mounting wall is formed on an arc centered on said hinge mounting.

6. Acceleration sensing device in accordance with claim 1 and which includes an arm secured to said mass and extending out of said chamber, a resistance element mounted to said chamber means, and a contact member mounted to said arm, and sliding on said resistance element.

7. Device in accordance with claim 1 including means defining adjustable orifice means in communication with said chamber for adjusting the rate of damping of said mass in its to and fro movement in said chamber.

8. Device in accordance with claim 1 including means defining an adjustable orifice means in said mass for adjusting the rate of damping of said plate in its oscillations.

9. In an acceleration sensing device, a chamber comprising a bottom portion, a pair of oppositely positioned end walls, a pair of oppositely positioned side walls fixedly attached to said end walls, said walls and said bottom portion being joined together in substantially airtight relationship, and a top portion including a bar, leaf spring means for hingedly mounting said bar at one end thereof from one of said end walls for rotation about an axis substantially parallel to the broad surfaces of said bottom portion, the inner surface of the other of said end walls having an arcuate shape formed on an arc centered at the axis of rotation of said bar, said top portion substantially hermetically sealing said chamber; said chamber containing fluid, which may be air; an electrically conductive arm fixedly attached to said bar; an electrical terminal connected to one end of said arm; a contact member attached to the other end of said arm; and a resistance element, said contact member slidably engaging said resistance element, the resistance between said contact member and either end of said resistance element being indicative of accelerations to which said bar is subjected.

10. The device as recited in claim 9 and additionally comprising adjustable orifice means formed in one of said sides, top portion, and bottom portion of said chamber for adjusting the damping rate of said top portion.

References Cited in the file of this patent

UNITED STATES PATENTS

| | | |
|---|---|---|
| 1,155,471 | Davis | Oct. 5, 1915 |
| 2,332,994 | Draper et al. | Oct. 26, 1943 |
| 2,359,245 | Ritzmann | Sept. 26, 1944 |
| 2,453,548 | Statham | Nov. 9, 1948 |
| 2,598,552 | Jansen | May 27, 1952 |
| 2,822,161 | Tikanen | Feb. 4, 1958 |
| 2,907,560 | Stedman | Oct. 6, 1959 |
| 2,950,908 | Rainsberger et al. | Aug. 30, 1960 |

FOREIGN PATENTS

| | | |
|---|---|---|
| 1,012,387 | France | Apr. 16, 1952 |
| 764,388 | Great Britain | Dec. 28, 1956 |